June 18, 1963    E. L. WOODCOCK ETAL    3,094,001
RADIATION PYROMETER
Filed Feb. 16, 1960    2 Sheets-Sheet 2
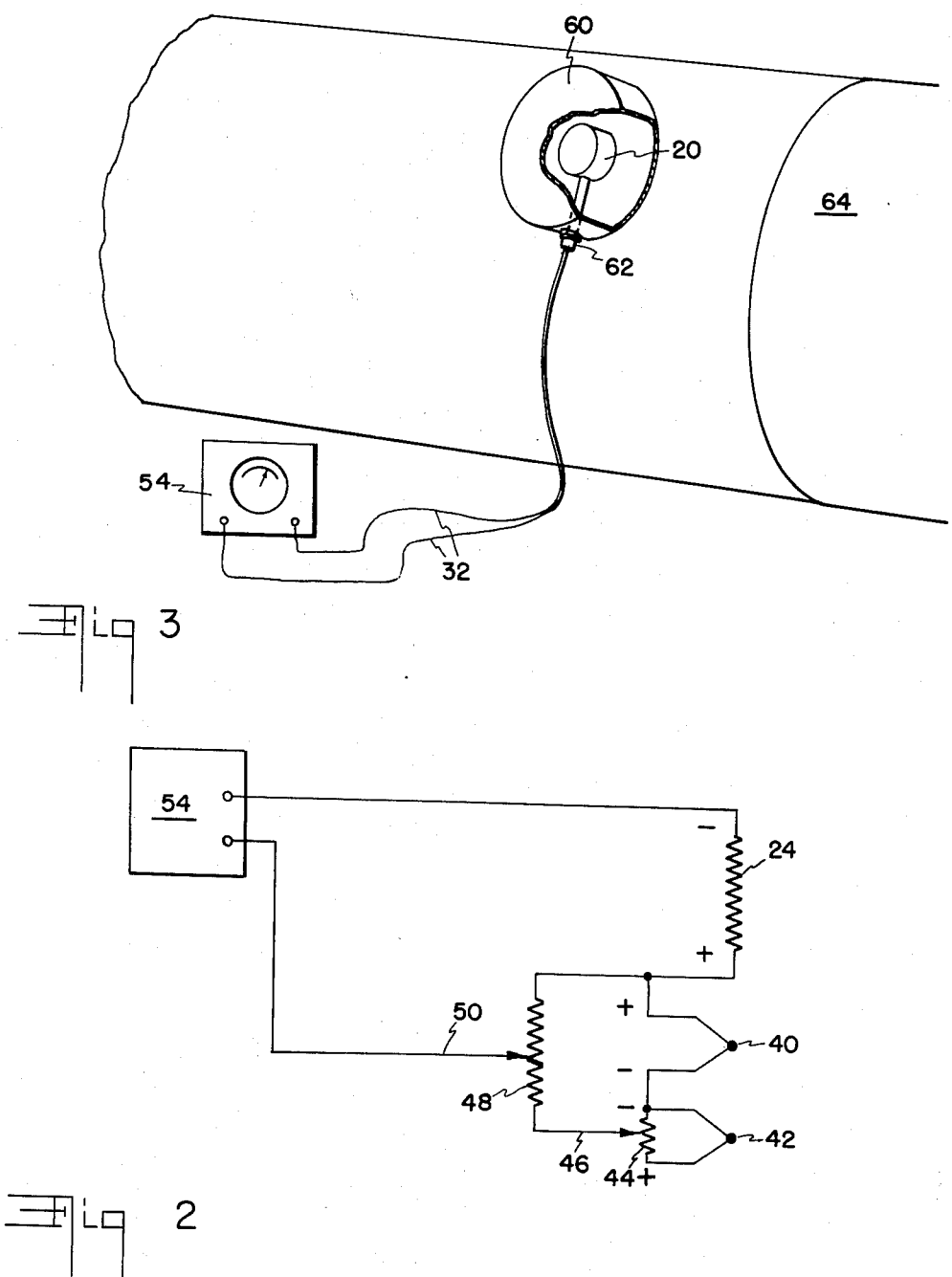
INVENTORS
EUGENE L. WOODCOCK
GORDON W. DUEKER
BY MARCEL J. E. GOLAY
ATTORNEY

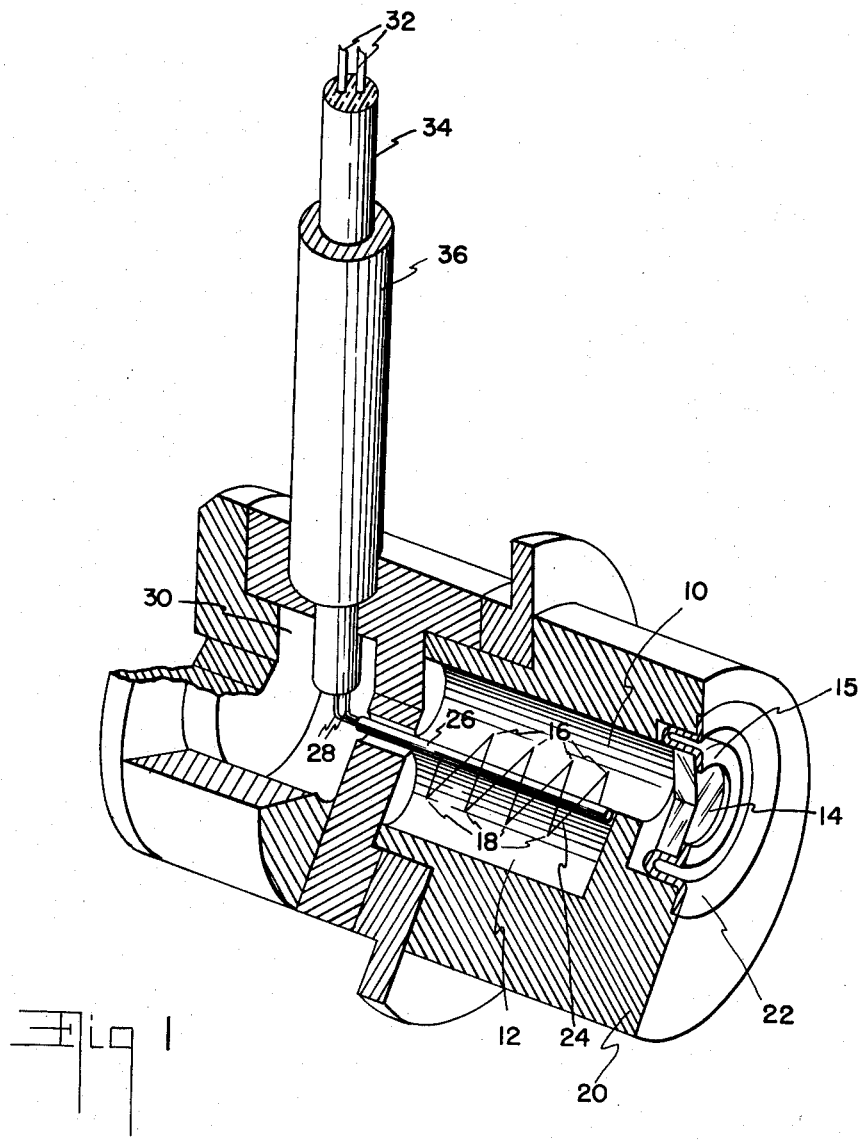

3,094,001
RADIATION PYROMETER

Eugene L. Woodcock, Stratford, and Gordon W. Dueker, Georgetown, Conn., and Marcel J. E. Golay, Rumson, N.J., assignors to The Perkin-Elmer Corporation, Norwalk, Conn., a corporation of New York
Filed Feb. 16, 1960, Ser. No. 9,103
10 Claims. (Cl. 73—355)

This invention relates to pyrometers and, more particularly, to a gas radiation pyrometer.

In working with aircraft and missile jet and rocket engines, it has become apparent that a need exists for a reliable pyrometer capable of measuring the temperature of engine gases. While radiation pyrometers generally are well known to the art, none of the existing instruments have been capable of providing accurate determinations under the rigorous environments existing in modern jet and rocket engines. The gas temperatures to be measured approximate 4,000° F. and an operational detector should be able to withstand vibrations of 100 G. Further, a detector should be capable of operating at an ambient temperature of approximately 1,500° F.

It is, therefore, an object of the present invention to provide a radiation pyrometer for indicating the temperature of gaseous bodies. Other objects are to provide such an apparatus capable of measuring the radiation level at specific wavelengths, capable of withstanding extreme ambient temperatures, and having maximum resistance to physical and thermal shock.

The above objects are achieved by providing a pyrometer having a body of heat coducting material. The body defines a plurality of enclosed chambers. Series connected thermocouples are provided, approximately evenly distributed between the two chambers. A window in the body wall communicates with one of the chambers. Fluid surrounds the thermocouples in one of the chambers, and the temperature of the fluid is responsive both to the temperature of the body section and to the radiation admitted by the window. A fluid surrounds the thermocouples in the other chamber and has a temperature responsive to that of the body section. Electrical conductor means extend through the body section and are connected to both sets of thermocouples.

The apparatus of this invention will be more apparent from the following detailed description and by reference to the three figures of the accompanying drawings wherein:

FIG. 1 is a cut-away view of a detector embodying the present invention;

FIG. 2 is a schematic diagram of an electrical compensation circuit suitable for use with the present invention; and FIG. 3 is an illustration of a detector mounted in the wall of a jet engine.

The detector of the present invention is a selective detector operating on the principle that a gas which emits radiation in narrow, discrete wavelength bands will conversely absorb radiation only in these same bands. In the specific embodiment described herein carbon dioxide was selected as the specific gas. Carbon dioxide is one of the main constituents in the combustion proudcts of jet and rocket hydrocarbon fuels and radiates in two main bands having wavelengths centered at 2.7 microns and 4.3 microns.

Referring to FIG. 1, a radiation pyrometer is shown containing an active chamber 10 and a reference chamber 12. The chambers are substantially symmetrical. A window 14 is provided which allows radiation to enter the active chamber. The carbon dioxide in chamber 10 selectively absorbs the incident radiation and its temperature rises accordingly. The increase in temperature of the contained gas heats the junctions 16 of the thermopile which is centered within the chamber. Due to the high reflectivity of the side walls and the thermopile element as well as the small size of the element, directly absorbed radiation is minimized. Thermopile junctions 16 in the active chamber are referenced against thermopile junctions 18 in the similar reference chamber 12. Chamber 12, however, is shielded from any direct radiation. Reference chamber 12 is filled with carbon dioxide which is affected only by the ambient temperature of body section 20. The output of the thermopile is thus a function of the temperature difference between the gas in the active chamber 10 and the gas in the reference chamber 12, and is a function of combustion gas radiation. Thermopile 24 is in ribbon form and is mounted in a ceramic tube 26. Thermopile leads 28 extend through tube 26 into isothermal chamber 30 and are brazed to nickel output leads 32. Output leads 32 extend through a ceramic tube 34 encased in a silver sheath 36 brazed to pyrometer body 20 at one end and to a flexible tab on the outer housing 60 (later described) at the other end.

The selection of a suitable window material will, of course, depend upon the particular radiation bands of interest and upon the physical capabilities required. The window and its flange may reach temperatures 150° F. to 200° F. higher than the pyrometer detector body. In the present embodiment, measuring radiation at 2.7 and 4.3 microns, synthetic sapphire fulfills the transmission requirements at the ambient temperatures involved. The metallized sapphire window 14 is brazed to a metal flange 22 which is, in turn, brazed to detector body 20. At the temperatures and under the conditions for which the apparatus was specifically designed, it was necessary to provide a flange material capable of resisting corrosion and maintaining a hermetic sel throughout the temperature cycle. Platinum was selected as the material for flange 22, as it is suitably resistant to corrosion and its coefficient of expansion is very close to that of sapphire.

In view of the high thermal and mechanical forces which must be withstood by the detector, other precautions than selection of materials must be taken. One of these relates to the shape of flange 22. In spite of the fact that the coefficients of expansion of the flange and sapphire are similar, it is necessary to provide a flange capable of mechanical deformation substantially equal in all directions. This has been best achieved by providing a configuration either similar to that shown in FIG. 1, wherein the cross section of flange 22 resembles a U, or wherein more than one convolution is present, as in an S. Further, it has been found necessary, using this selection of materials, to allow .001 inch clearance between the front surface of the window and the inner rim 15 of flange 22 prior to brazing. Pure silver is used for brazing.

The body 20 of the detector must be isothermal and hermetically sealed, must have a low infrared absorption coefficient, and must retain these characteristics at a temperature of 1,500° F. ambient. In the particular embodiment described, silver, either pure or incorporating a small percentage of nickel for high temperature strength, has been found to satisfy these requirements. Detector body 20 is made in a form which assists in maintaining isothermal conditions and in assuring a mechanically stable design. Extended cross sections are avoided, and a small compact mass is obtained. The inside surfaces of chambers 10 and 12 are given a high polish to assure minimum direct radiation absorption by the walls. The carbon dioxide atmosphere within the chambers protects them from corrosion and retains the polish even at high ambient operating temperatures. Since the detector signal should result solely from radiant energy absorbed by the gas in the active chamber, direct sensing of radiation by the thermoelectric element is undesirable. It has been found satisfactory to construct the thermopile of chromel-constantan ribbon, assembled so that the incoming radiation strikes the element edgewise to limit direct absorption. This configuration has also been found to be advantageous in that the thermopile element is quite pliable and, therefore, has no resonant frequency which could induce breakage.

When the detector of this invention is inserted in the wall of an enclosed, heated tube, as would normally be the case in jet and rocket engine applications, it is subject to variations due to its own temperature and also due to the temperature of the gas layer adjoining the jet inner liner.

The detector temperature affects the detector output by acting upon the thermopile elements in the reference chamber. Therefore, this temperature is continually subtracted electrically from the output of the thermopile elements in the active chamber.

The gas layer between the detector window and the hotter flame beyond contains carbon dioxide. Therefore, it acts as an absorbing filter with respect to the radiation activating the detector.

The first effect, increase in detector temperature, causes a gradual drop in output after a peak has been reached. The second effect, variation in the temperature of the gas layer between the inner liner and the control flame results in a modulation of the originally fast detector response.

The temperature of the jet inner liner is a function of the temperature of the adjoining gas layer. Both this temperature and the temperature of the detector vary relatively slowly due to the large masses involved and, in normal power plant applications, never reach temperatures above 1500° F. Consequently, both temperatures can be easily measured by thermocouples. A resultant voltage, obtained by combining an empirical percentage of the voltage produced by each thermocouple, may be used to nullify the undesirable effects.

The manner in which the foregoing compensation is effected will be seen by reference to FIG. 2. The wall thermocouple 40 and the detector thermocouple 42 are connected in opposing polarity. A potentiometer 44 is provided across the output of thermocouple 42 and is provided with a tap 46 for selecting a percentage of the voltage output. A second potentiometer 48 is connected to receive the sum of the voltages produced by thermocouples 40 and 42. A proportion of this sum is picked off by tap 50. The voltage produced by the thermopile 24 of the detector is then connected in series with the voltage of tap 50 and the resultant compensated voltage comprises the input to a meter or recorder 54.

The manner in which the detector of the invention is installed on an engine will be apparent from FIG. 3. An outer housing 60 totally encloses detector body 20 and is provided with a suitable connector 62 for the passage of conductors 32 therethrough. Housing 60 is attached directly to the engine 64 and the space between detector 20 and housing 60 is filled with ceramic wool or other insulating medium.

The outer housing has two principal functions. It furnishes mechanical protection for the relatively soft silver detector body and its electrical connections. It also provides an insulating sheath around those portions of the detector projecting from the wall of the jet engine. Although variations in the overall temperature of the cell body have no effect on the pyrometer output when compensation circuits are used, unequal cooling may result in temperature gradients within the detector body with resultant D.C. drift problems. The design of the housing is not critical. The housing illustrated is constructed of nickel to provide high temperature strength and corrosion resistance.

As a specific example of the present invention, a detector similar to that described was mounted on the afterburner of a General Electric J47 jet engine. The mounting flange was welded to the outer skin of the afterburner with the pyrometer face mounted flush with the inner liner. The detector body was of silver containing a small percentage of nickel. A synthetic sapphire window 1.5 mm. thick and metallized with a molybdenum compound was brazed to the U shaped silver flange. The unit was filled with $CO_2$ to a pressure of 150 mm. Hg at 300° K. As the output of such a detector utilizing a chromel-constantan thermopile is approximately 6 millivolts at 3000° F., no amplification was needed and the detector output leads were wired directly to a 0 to 20 millivolt pen recorder. The detector response compared favorably with that of a water-cooled iridium, iridium-rhodium thermocouple and sensed the afterburner flame temperature of 3000° F., indicating both "military" and "idle" levels of engine operation. The inner liner temperature averaged approximately 1200° F., the outer wall 800° F., and the detector body 1000° F. The detector was completely undamaged and the window remained clean and intact.

It is to be understood that the apparatus described herein is subject to numerous variations. The invention is to be construed as limited only by the scope of the appended claims.

We claim:

1. A radiation pyrometer comprising a body section of heat conducting material, said body section defining a plurality of substantially symmetrical enclosed chambers; first thermocouple means in one of said chambers; second thermocouple means in another of said chambers; means connecting said first and second thermocouple means is electrical series relationship; window means communicating between the chamber containing said first thermocouple means and the outer surface of said body section; a fluid surrounding said first thermocouple means having a temperature responsive to the temperature of said body section and to the radiation admitted by said window; a fluid surrounding said second thermocouple means having a temperature responsive to the temperature of said body section; and conductor means extending through said body section, connected to said first and second thermocouple means, and responsive to the voltages produced thereby.

2. The apparatus of claim 1 wherein said first thermocouple means comprises ribbon-like elements having their smaller dimensions normal to the incoming radiation.

3. The apparatus of claim 1 wherein said window means comprises a radiation-permeable member supported by a mechanically deformable frame.

4. A radiation pyrometer comprising a substantially cylindrical body of heat conducting material, said body defining a plurality of substantially cylindrical enclosed symmetrical chambers, at least two of said chambers having their longitudinal axes parallel to the longitudinal axis of said body and being approximately tangent to each other; window means in said body communicating with one of said chambers; electrically resistive thermopile support means extending substantially along the line of tangency between the tangent chambers; thermopile element means supported by said support means and extending into both of said tangent chambers; and electrical conductor means connected to said thermopile means and passing through the wall of the pyrometer body.

5. The apparatus of claim 4 wherein the thermopile element means comprises ribbon-like segments having their shorter dimensions substantially normal to the radiation from said window means.

6. The apparatus of claim 5 wherein said window means is a radiation-permeable disc bonded to an annular, radially-deformable mount.

7. The apparatus of claim 6 wherein said chambers contain a gas capable of absorbing radiation of at least one preselected wavelength.

8. The apparatus of claim 7 wherein said window is of a material selected from the group consisting of sapphire and synthetic sapphire, and said gas is carbon dioxide.

9. Radiation monitoring apparatus which comprises tubular means adapted to contain therein a high temperature fluid; radiation detector means mounted in the wall of said tubular means responsive to radiation from said fluid and adapted to provide an electrical output in accordance therewith; first thermally responsive electrical means adapted to produce an electrical signal proportional to the wall temperature of said tubular means; second thermally responsive electrical means adapted to produce an electrical signal proportional to the temperature of said detector means; means for electrically subtracting at least a portion of the output of one of said first and second thermally responsive electrical means from the output of the other of said first and second thermally responsive electrical means; means for electrically combining at least a portion of the electrical signal thereby obtained with the electrical output of said radiation detector means; and indicating means responsive to the combined signals for indicating the radiation from said high temperature fluid.

10. The apparatus of claim 9 wherein said thermally responsive electrical means are thermocouples.

References Cited in the file of this patent

UNITED STATES PATENTS

| | | |
|---|---|---|
| 1,891,039 | Barton | Dec. 13, 1932 |
| 2,431,019 | Barns | Nov. 18, 1947 |
| 2,543,369 | Kling | Feb. 27, 1951 |
| 2,951,944 | Foug | Sept. 6, 1960 |

FOREIGN PATENTS

| | | |
|---|---|---|
| 539,420 | France | Sept. 6, 1960 |
| 640,711 | Great Britain | July 26, 1950 |
| 816,849 | Great Britain | July 22, 1959 |